United States Patent
Rice et al.

(10) Patent No.: US 9,558,600 B2
(45) Date of Patent: Jan. 31, 2017

(54) DUTY CYCLE RECORDING SYSTEM AND METHOD FOR ESTIMATION OF DAMAGE AND REMAINING LIFE OF DRIVETRAIN COMPONENTS

(71) Applicant: Deere & Company, Moline, IL (US)

(72) Inventors: Timothy D. Rice, Independence, KS (US); Kyle K McKinzie, Altamont, KS (US); Darren J Ziskovsky, Independence, KS (US); Clayton G Janasek, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 29 days.

(21) Appl. No.: 14/449,563

(22) Filed: Aug. 1, 2014

(65) Prior Publication Data

US 2016/0035155 A1  Feb. 4, 2016

(51) Int. Cl.
*F16H 57/01* (2012.01)
*G07C 5/08* (2006.01)
*F16H 61/12* (2010.01)
*G07C 5/12* (2006.01)

(52) U.S. Cl.
CPC .............. *G07C 5/08* (2013.01); *F16H 57/01* (2013.01); *F16H 61/12* (2013.01); *G07C 5/0808* (2013.01); *G07C 5/0841* (2013.01); *G07C 5/12* (2013.01)

(58) Field of Classification Search
None
See application file for complete search history.

(56) References Cited

U.S. PATENT DOCUMENTS

| | | | | |
|---|---|---|---|---|
| 4,967,620 A | * | 11/1990 | Shimanaka | F16H 61/0437 477/155 |
| 2007/0210728 A1 | * | 9/2007 | Musser | B60W 10/08 318/53 |
| 2012/0029892 A1 | * | 2/2012 | Thulke | F03D 7/045 703/7 |
| 2012/0053984 A1 | * | 3/2012 | Mannar | G06Q 50/06 705/7.28 |
| 2014/0088888 A1 | * | 3/2014 | Poon | F03B 15/00 702/34 |
| 2015/0134189 A1 | * | 5/2015 | Wash | G07C 5/006 701/29.4 |

FOREIGN PATENT DOCUMENTS

| | | |
|---|---|---|
| DE | 10327031 A1 | 1/2005 |
| DE | 10393954 T5 | 12/2005 |
| EP | 1508880 A2 | 2/2005 |

OTHER PUBLICATIONS

German Search Report in foreign counterpart application No. 102015214357.0 dated May 25, 2016 (8 pages).

\* cited by examiner

*Primary Examiner* — Justin Holmes

(57) ABSTRACT

A duty cycle recording system and method is disclosed for a vehicle with a drivetrain having a plurality of components and sensors. The duty cycle recording system may include a control unit and communication link. The control unit may receive sensor readings, compute damage estimates for drivetrain components based on the readings, and compute estimated remaining life (ERL) estimates based on the damage estimates. The communication link may transmit the computed damage and ERL estimates. The control unit may sample transmission torque and speed sensor readings, and for each sample may populate a three-dimensional histogram of transmission torque and speed the vehicle has experienced.

13 Claims, 2 Drawing Sheets

DUTY CYCLE RECORDING SYSTEM AND METHOD FOR ESTIMATION OF DAMAGE AND REMAINING LIFE OF DRIVETRAIN COMPONENTS

FIELD OF THE DISCLOSURE

The present disclosure relates to vehicle drivetrain components and more particularly to estimation of damage and remaining life expectancy of vehicle drivetrain components.

BACKGROUND

When designing for both on-road automotive and off-highway machinery applications it is desirable to have a clear and accurate understanding of the duty cycle to which the drivetrain of a specific machine or population of machines is exposed. While a knowledge of the expected range of drivetrain torques and speeds is generally helpful to the design process, it is the amount of time the system spends under various combinations of torque and speed conditions—the "duty cycle"—that primarily determines the degree of damage that drivetrain components incur over the life of the machine.

A significant problem facing mechanical designers and equipment manufacturers today is a lack of comprehensive and accurate off-highway vehicle drivetrain duty cycle information. This situation owes to several factors. Production and operation of experimental machines from which duty cycle data may be collected is costly. The cost of instrumenting test machines for the purposes of duty cycle collection is usually high. The number of experimental machines is typically low, the test periods are usually brief, and test operators are usually few, thus limiting both the quantity and breadth of data available. Obtaining data from customer-owned machines has drawbacks and is often difficult with past instrumentation and data collection methods. Drivetrain laboratory test installations can introduce inaccuracies since overall system dynamics specific to the vehicle cannot be easily replicated with high fidelity in a lab environment. Hence, duty cycles are at best estimates, and at worst guesses, with the general result that drivetrains are overdesigned and over-tested. Without accurate duty cycle data there is also a risk that the drivetrain design or validation testing may fail to account for conditions arising from unforeseen applications of the machine.

A secondary problem is the desire to estimate the remaining life of key mechanical components within the drivetrain on an individual vehicle and to make that data available to the operator or a service technician. Remaining life calculations cannot be done without the ability to collect and store accurate and comprehensive duty cycle data.

Understanding the duty cycle of drivetrain components can be used to inform design and/or maintenance decisions for key individual components of the drivetrain that are subject to fatigue and wear (e.g. gears, bearings). When machine drivetrain duty cycle information is known prior to designing the drivetrain for a new or similar machine, it can be beneficial in numerous ways, for example, to reduce or eliminate drivetrain design and test iterations, to appropriately size individual drivetrain components, to appropriately tailor laboratory durability and reliability testing, etc. When machine drivetrain duty cycle information is known during the period when a machine is produced and sold, it can also be beneficial in numerous ways, for example, to increase machine uptime, to decrease warranty claims and associated costs, to identify individual machines in a population having a high rate of change in damage figures, to plan and schedule maintenance in advance (prognostics/predictive maintenance), etc.

It would be desirable to have a system and method for collecting and processing drivetrain duty cycle information by an onboard system during vehicle usage.

SUMMARY

Embodiments of a duty cycle recording system are disclosed for a vehicle with a drivetrain having a plurality of drivetrain components and a plurality of sensors. The duty cycle recording system may include an electronic control unit and a communication link. The electronic control unit may include a control processor configured to receive sensor readings from the plurality of sensors, compute damage estimates for the drivetrain components based on the received sensor readings, and compute estimated remaining life (ERL) estimates for the drivetrain components based on the damage estimates. The communication link is configured to communicate with the electronic control unit, and to transmit the computed damage and ERL estimates for the drivetrain components.

In some embodiments, the electronic control unit may also include a control memory accessible to the control processor, where the control memory stores three-dimensional histogram data of transmission torques and speeds to which the vehicle has been exposed. The plurality of sensors may include a transmission torque sensor and a transmission speed sensor providing transmission torque and speed sensor readings. The control processor may be configured to sample the transmission torque and speed sensor readings, and for each sample find a corresponding cell in the three-dimensional histogram data for the sampled transmission torque and speed sensor readings, and increment a cell counter of the corresponding cell in the three-dimensional histogram data. The damage estimates for the drivetrain components may be computed based on the accumulated three-dimensional histogram data. The communication link may be configured to wirelessly transmit the computed damage and ERL estimates, and the accumulated three-dimensional histogram data at fixed intervals and upon request.

In other embodiments, the electronic control may also include a control memory accessible to the control processor, where the control memory stores a plurality of three-dimensional histogram data of transmission torques and speeds to which the vehicle has been exposed, each of the plurality of three-dimensional histogram data being for a different transmission operating gear. The plurality of sensors may include a transmission operating gear sensor, a transmission torque sensor and a transmission speed sensor providing transmission operating gear sensor readings and transmission torque and speed sensor readings. The control processor may be configured to sample the transmission operating gear sensor readings and the transmission torque and speed sensor readings, and for each sample first select the three-dimensional histogram data of the plurality of three-dimensional histogram data for the sampled transmission operating gear, then find a corresponding cell in the selected three-dimensional histogram data for the sampled transmission torque and speed sensor readings, and increment a cell counter of the corresponding cell in the selected three-dimensional histogram data. The damage estimates for the drivetrain components may be computed based on the accumulated plurality of three-dimensional histogram data. The communication link may be configured to wirelessly transmit the computed damage and ERL estimates, and the accumulated plurality of three-dimensional histogram data at fixed intervals and upon request.

The duty cycle recording system may also include an onboard data network, where the electronic control unit is coupled to the onboard data network, and the electronic control unit is configured to receive the sensor readings from the plurality of sensors over the onboard data network. The duty cycle recording system may also include a vehicle data transmitter coupled to the onboard data network, where the communication link is part of the vehicle data transmitter, and the electronic control unit and the vehicle data transmitter communicate over the onboard data network. The communication link may be configured to wirelessly transmit the computed damage and ERL estimates, and the accumulated three-dimensional histogram data at fixed intervals and upon request.

The vehicle data transmitter may also include a transmitter processor and a transmitter memory. The control processor may be configured to store the accumulated three-dimensional histogram data and the computed damage and ERL estimates in the control memory. The transmitter processor may be configured to sample the accumulated three-dimensional histogram data and the computed damage and ERL estimates in the control memory and store the sampled three-dimensional histogram data and damage and ERL estimates in the transmitter memory. The communication link may be configured to wirelessly transmit the sampled three-dimensional histogram data and damage and ERL estimates stored in the transmitter memory at fixed intervals and upon request.

A duty cycle recording method may include receiving sensor readings from the plurality of sensors, computing damage estimates for the drivetrain components based on the received sensor readings, computing ERL estimates for the drivetrain components based on the damage estimates, and transmitting the computed damage and ERL estimates for the drivetrain components.

In some embodiments, receiving sensor readings may include receiving transmission torque and speed sensor readings, and a control memory may store three-dimensional histogram data of transmission torques and speeds to which the vehicle has been exposed. In these embodiments, the method may also include sampling the transmission torque and speed sensor readings, and for each sample, finding a corresponding cell in the three-dimensional histogram data for the sampled transmission torque and speed sensor readings, and incrementing a cell counter of the corresponding cell in the three-dimensional histogram data. The method may also include storing the damage and ERL estimates for the drivetrain components in control memory; sampling the accumulated three-dimensional histogram data, and the damage and ERL estimates in the control memory; storing the sampled three-dimensional histogram data, and the damage and ERL estimates in a transmitter memory; and wirelessly transmitting the sampled three-dimensional histogram data, and the damage and ERL estimates stored in the transmitter memory at fixed intervals and upon request.

In other embodiments, receiving sensor readings may include receiving transmission operating gear sensor readings, transmission torque sensor readings and transmission speed sensor readings, and a control memory may store a plurality of three-dimensional histogram data of transmission torques and speeds to which the vehicle has been exposed, each of the plurality of three-dimensional histogram data of transmission torques and speeds being for a different transmission operating gear. The method may also include sampling the transmission operating gear sensor readings, the transmission torque sensor readings and the transmission speed sensor readings; and for each sample: selecting the three-dimensional histogram data of the plurality of three-dimensional histogram data of transmission torques and speeds for the sampled transmission operating gear; finding a corresponding cell in the selected three-dimensional histogram data for the sampled transmission torque and speed sensor readings; and incrementing a cell counter of the corresponding cell in the selected three-dimensional histogram data. The method may also include storing the computed damage and ERL estimates for the drivetrain components in control memory, sampling the accumulated plurality of three-dimensional histogram data, and the damage and ERL estimates in the control memory, storing the sampled plurality of three-dimensional histogram data, and the damage and ERL estimates in a transmitter memory, and wirelessly transmitting the sampled plurality of three-dimensional histogram data, and the damage and ERL estimates stored in the transmitter memory at fixed intervals and upon request.

The above and other features will become apparent from the following description and the attached drawings.

BRIEF DESCRIPTION OF THE DRAWINGS

The detailed description of the drawing refers to the accompanying figures in which.

DETAILED DESCRIPTION

Understanding the duty cycle of drivetrain components of a vehicle may inform both design and maintenance decisions for key individual components of the drivetrain that are subject to fatigue and wear (e.g. gears, bearings). Drivetrain duty cycle information may be collected by an onboard electronic system for processing and communication. This duty cycle information may be used for various purposes including estimation of damage to drivetrain components and estimation of the remaining life of drivetrain components.

Figure 1:
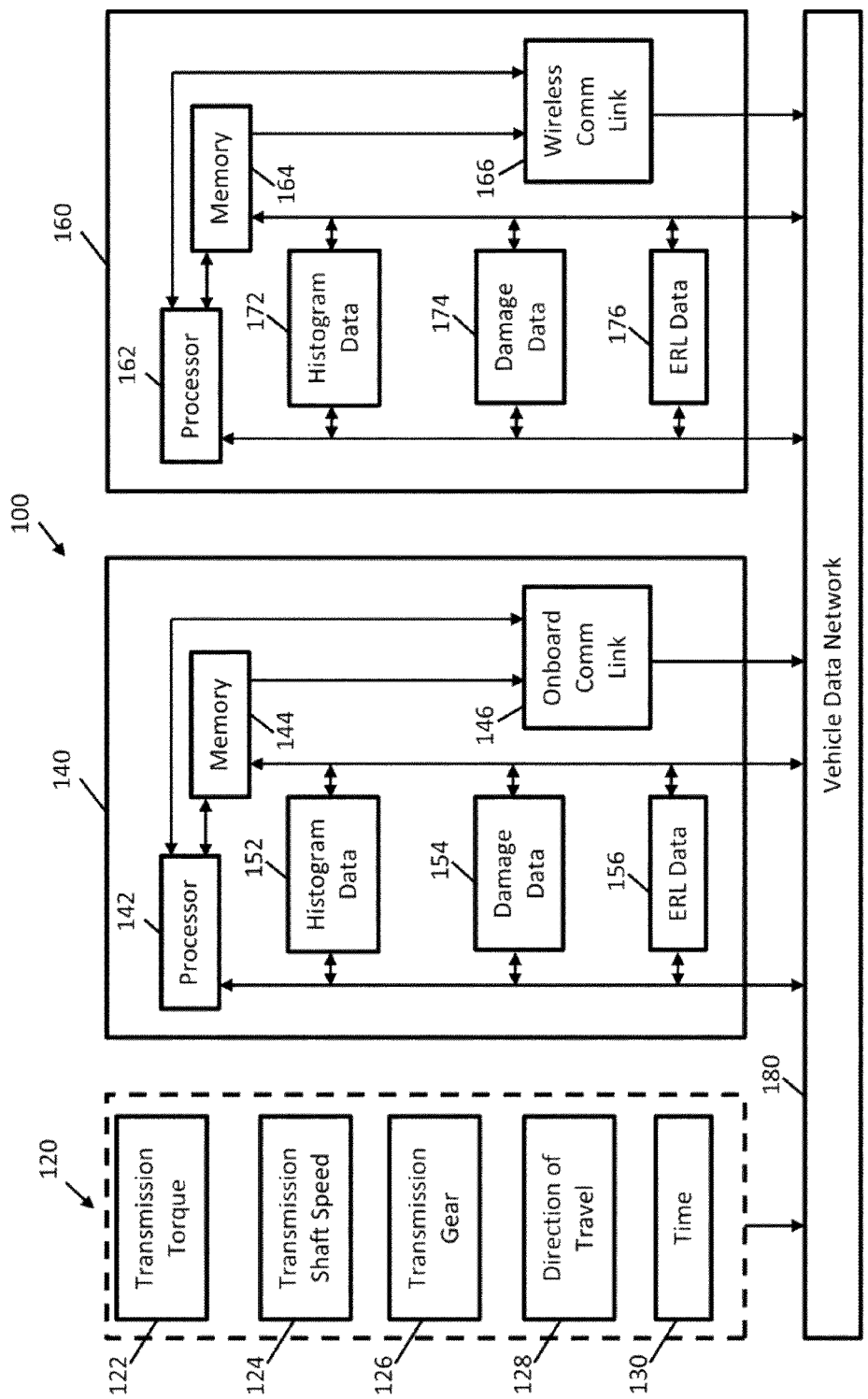
FIG. 1 illustrates an exemplary duty cycle recording system.

FIG. 1 illustrates an exemplary embodiment of a system 100 for collecting, recording, processing and communicating drivetrain component duty cycle information. The system 100 may include a plurality of vehicle data systems and sensors 120, an electronic control unit 140, a vehicle data transmitter 160 and a vehicle onboard controller data network 180. The plurality of vehicle data systems and sensors 120, the electronic control unit 140, and the vehicle data transmitter 160 may communicate over the onboard data network 180.

The plurality of vehicle data systems and sensors 120 may monitor a plurality of vehicle data and communicate the vehicle data over the onboard data network 180. Exemplary vehicle data systems and sensors 120 may include, for example, transmission shaft torque sensors 122 monitoring actual or estimated input and/or output transmission shaft torques, transmission shaft speed sensors 124 monitoring input and/or output transmission shaft speeds, transmission gear sensors 126 monitoring the active transmission gears, vehicle direction sensors 128 monitoring the vehicle direction of travel, time sensors 130 monitoring time and duration information for various vehicle components and systems, and various other sensors and sensor systems.

The electronic control unit 140 may reside on the vehicle and sends information to and receives information from other controllers through the onboard controller data network 180. The electronic control unit 140 may include a control processor or processor 142, memory 144 and onboard communication link 146.

Figure 2:
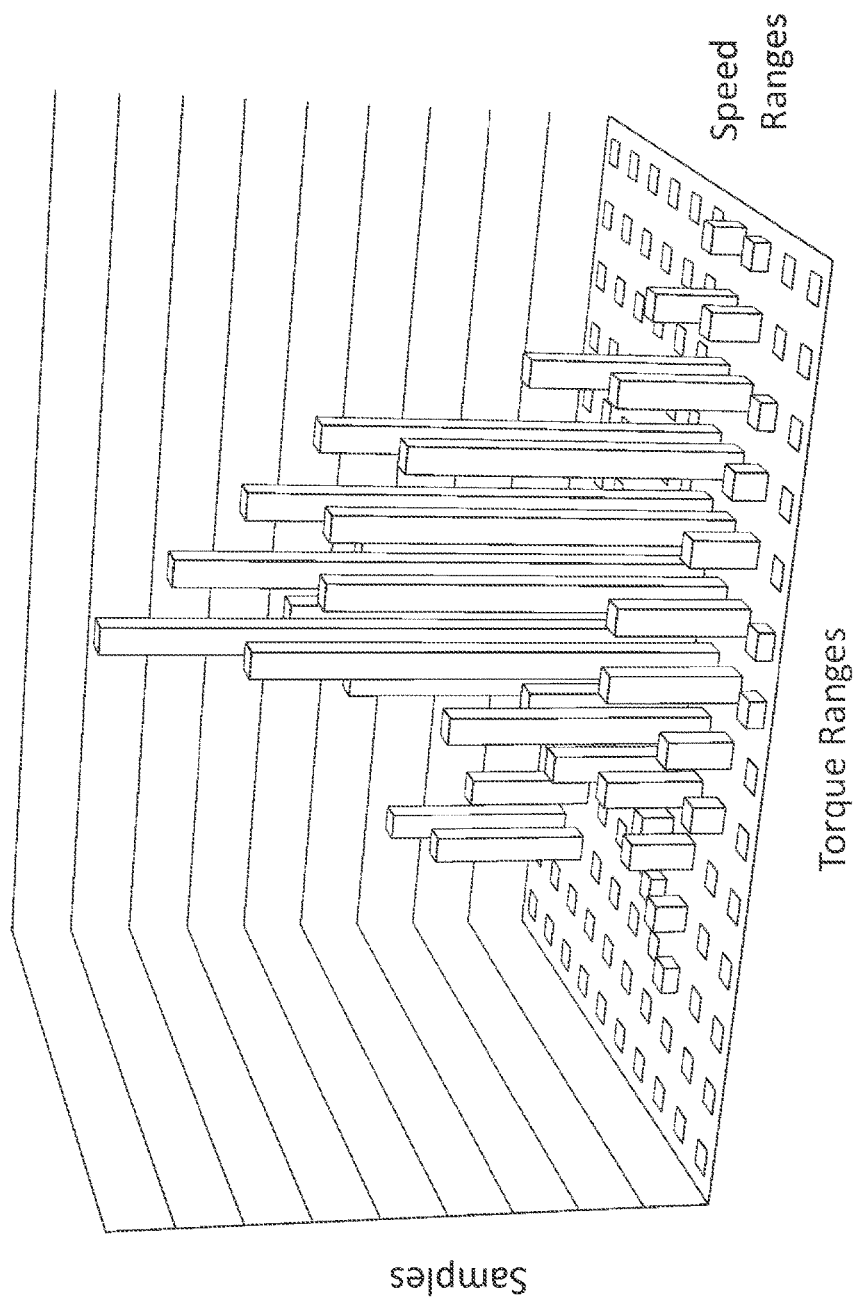
FIG. 2 illustrates an exemplary three-dimensional histogram reflecting the number of samples or time duration for different torque and speed ranges to which the vehicle transmission has been subjected.

During vehicle operation, the processor 142 may repeatedly sample the present transmission torque and speed data being communicated over the controller data network 180 by the transmission shaft torque and speed sensors 122, 124. The processor 142 may alternatively sample the transmission torque and speed data directly from the sensors 122, 124 where a direct interface exists. The processor 142 may use this data to populate a table of histogram data 152 having torque range as one axis and speed range as the other axis. In some embodiments, for each pair of actual sampled torque and speed data, the processor 142 finds the corresponding cell in the histogram data 152 and increments a cell counter for that cell to record the sampled torque and speed values. This process may be repeated, such that over time the cell counter values accumulated in the histogram data 152 constitute a three-dimensional histogram reflecting the torques and speeds to which the vehicle transmission has been subjected and the relative duration of each exposure. FIG. 2 illustrates an exemplary three-dimensional histogram reflecting the number of samples or time duration for different torque and speed ranges to which the vehicle transmission has been subjected. Separate tables may be maintained in the histogram data 152 for each transmission operating gear. There may be one or more separate three-dimensional histograms for each transmission operating gear. The histogram data 152 may be stored in the memory 144. The memory 144 may be non-volatile memory so that after vehicle shut-down the histogram data 152 is maintained, and on restart it may be recalled and additional data may be added to the histogram data 152. The histogram data 152 or other data from the memory 144 may be accessed or downloaded when desired from the electronic control unit 140 via the onboard communication link 146 to the onboard controller data network 180.

Based on the inputs received by the electronic control unit 140 over the onboard controller data network 180 and the histogram data 152, the processor 142 may also calculate damage data 154 and/or estimated remaining life (ERL) data 156 and store this data in the memory 144 or communicate it over the onboard controller data network 180. The damage data 154 may include, for example, damage figures and damage rate figures, and the ERL data 156 may include, for example, ERL figures applicable to each transmission operating gear. By tracking the various vehicle data 120 over time and the histogram data 152, the electronic control unit 140 may estimate the damage and ERL data 154, 156 for drivetrain components using algorithms known to those of ordinary skill in the art. The processor 142 may distill the histogram data 152 to a few key damage values of the damage data 154 and then calculate estimated remaining life data 156 for drivetrain components. This data may include for example, calculated damage and damage rates for a particular drivetrain gear, bearing or other components; and how long before a particular drivetrain gear, bearing or other components is expected to fail. These algorithms may also be updated and improved using the data collected by the electronic control unit 140 and inspecting drivetrain components during maintenance or repair. Like the histogram data 152, the damage and ERL data 154, 156 may be retained through vehicle operating cycles and may be downloaded when desired from the electronic control unit 140 through the onboard communication link 146. The histogram, damage and ERL data 152, 154, 156 may also be broadcast at fixed intervals over the onboard data network 180.

Estimated remaining life (ERL) data may be calculated from the damage figures derived from the torque-speed history to which the machine has been subjected. The ERL data may be calculated by subtracting the damage figures from the known life expectancy figures for the various mechanical components in the drivetrain which are subject to fatigue, breakage, or wear, for example, gears and bearings. The difference calculated for each component of interest may be used as an estimate of the remaining life for that component, and these figures may be used in a strategy for predictive maintenance and repair.

The vehicle data transmitter 160 includes a processor 162, memory 164 and a wireless communication link 166. The processor 162 of the vehicle data transmitter 160 may sample the histogram, damage and ERL data 152, 154, 156 computed and broadcast by the electronic control unit 140 over the onboard data network 180. The processor 162 of the vehicle data transmitter 160 may then populate and update histogram, damage and ERL data 172, 174, 176 retained in the memory 164 of the vehicle data transmitter 160. Alternatively, the processor 162 may sample the plurality of sensor data transmitted over the onboard data network 180 and independently create its own histogram, damage and ERL data 172, 174, 176 similar to the processor 142. In this alternative, the vehicle data transmitter 160 does not have to rely on the electronic control unit 140 for data collection and processing.

The vehicle data transmitter 160 may then communicate the histogram, damage and ERL data 172, 174, 176 through the wireless communication link 166. The vehicle data transmitter 160 may use the wireless communication link 166 to communicate this data to other local off-vehicle systems or to remote locations upon request or at regular intervals.

Users may use these real-time, actual usage values to schedule predictive vehicle maintenance before a vehicle breaks down. Vehicle designers and developers may accumulate these real-time, actual usage values across a population of numerous vehicles and determine the actual usage of each of these vehicles. The vehicle designers and developers may then use this accumulated actual usage data to size, design and test drivetrain components.

In other embodiments of the system 100, the wireless communication link 166 and other functionality of the vehicle data transmitter 160 may be incorporated into the electronic control unit 140. In these embodiments, the electronic control unit 140 may transmit the histogram, damage and ERL data 152, 154, 156 over the onboard data network 180 and to off-vehicle systems and locations upon request or at regular intervals.

The system 100 may use vehicle transmission input shaft torque and input shaft speed, or vehicle transmission output shaft torque and output shaft speed. Transmission output shaft parameters may also be used as input parameters for other key drivetrain components (e.g. axles), and it may be desirable to know the duty cycle to which these other drivetrain components are exposed.

There may be potential advantages of using the wireless communication link 166 of the vehicle data transmitter 160 instead of a data logger. The wireless communication link 166 may provide cost reductions and/or a more thorough sampling of the machine population due to use of standard, factory-installed machine electronics instead of field installation of additional proprietary or third party off-the-shelf data logging equipment. Using the wireless communication link 166 may also shorten the time between when the data is generated on the machine and when it is received for analysis; and may also reduce or eliminate the need for visits to the machine by trained service personnel to retrieve the data.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A duty cycle recording system for a vehicle with a drivetrain having a plurality of drivetrain components and a plurality of sensors, the duty cycle recording system comprising:

an electronic control unit comprising a control processor and a control memory accessible to the control processor, the control processor configured to receive sensor readings from the plurality of sensors, which include a transmission torque sensor providing transmission torque sensor readings and a transmission speed sensor providing transmission speed sensor readings, sample the transmission torque and speed sensor readings as a pair, and for each pair of sampled torque and speed sensor readings find a corresponding cell in a three-dimensional histogram data for the sampled transmission torque and speed sensor readings and increment a cell counter of the corresponding cell in the three-dimensional histogram data, compute damage estimates for the drivetrain components based on the accumulated three-dimensional histogram data, and compute estimated remaining life (ERL) estimates for the drivetrain components based on the damage estimates, the control memory storing the three-dimensional histogram data of transmission torques and speeds to which the vehicle has been exposed; and a communication link configured to communicate with the electronic control unit, and to transmit the computed damage and ERL estimates for the drivetrain components.

2. The duty cycle recording system of claim 1, wherein the three-dimensional histogram data includes a plurality of three-dimensional histogram data, each three-dimensional histogram data being for a different transmission operating gear;

wherein the plurality of sensors further includes a transmission operating gear sensor providing transmission operating gear sensor readings; and wherein the control processor is configured to sample the transmission operating gear sensor readings and the transmission torque and speed sensor readings as a pair, and for each sample first select the three-dimensional histogram data of the plurality of three-dimensional histogram data for the sampled transmission operating gear, then find a corresponding cell in the selected three-dimensional histogram data for the sampled pair of transmission torque and speed sensor readings and increment a cell counter of the corresponding cell in the selected three-dimensional histogram data.

3. The duty cycle recording system of claim 2, wherein the damage estimates for the drivetrain components are computed based on the accumulated plurality of three-dimensional histogram data.

4. The duty cycle recording system of claim 1, further comprising an onboard data network, the electronic control unit coupled to the onboard data network, and the electronic control unit configured to receive the sensor readings from the plurality of sensors over the onboard data network.

5. The duty cycle recording system of claim 4, further comprising a vehicle data transmitter coupled to the onboard data network, the communication link being part of the vehicle data transmitter, the electronic control unit and the vehicle data transmitter communicating over the onboard data network.

6. The duty cycle recording system of claim 5, wherein the communication link is configured to wirelessly transmit the computed damage and ERL estimates, and the accumulated three-dimensional histogram data at fixed intervals and upon request.

7. The duty cycle recording system of claim 5, wherein the vehicle data transmitter further comprises a transmitter processor and a transmitter memory; and wherein the control processor is configured to store the accumulated three-dimensional histogram data and the computed damage and ERL estimates in the control memory; and wherein the transmitter processor is configured to sample the accumulated three-dimensional histogram data and the computed damage and ERL estimates in the control memory and store the sampled three-dimensional histogram data and damage and ERL estimates in the transmitter memory.

8. The duty cycle recording system of claim 7, wherein the communication link is configured to wirelessly transmit the sampled three-dimensional histogram data and damage and ERL estimates stored in the transmitter memory at fixed intervals and upon request.

9. A duty cycle recording method for a vehicle with a drivetrain having a plurality of drivetrain components and a plurality of sensors, the duty cycle recording method comprising:

receiving sensor readings from the plurality of sensors, which includes receiving transmission torque sensor readings from a transmission torque sensor and transmission speed sensor readings from a transmission speed sensor;

sampling the transmission torque and speed sensor readings as a pair;

retrieving a three-dimensional histogram data of transmission torques and speeds to which the vehicle has been exposed from control memory;

finding a corresponding cell in the three-dimensional histogram data for the sampled pair of transmission torque and speed sensor readings;

incrementing a cell counter of the corresponding cell in the three-dimensional histogram data;

storing the three-dimensional histogram data of transmission torques and speeds to which the vehicle has been exposed in control memory;

computing damage estimates for the drivetrain components based on the accumulated three-dimensional histogram data of transmission torques and speed sensor readings;

computing estimated remaining life (ERL) estimates for the drivetrain components based on the damage estimates; and transmitting the computed damage and ERL estimates for the drivetrain components.

10. The duty cycle recording method of claim 9, further comprising:

storing the damage and ERL estimates for the drivetrain components in control memory;

sampling the accumulated three-dimensional histogram data, and the damage and ERL estimates in the control memory;

storing the sampled three-dimensional histogram data, and the damage and ERL estimates in a transmitter memory; and wirelessly transmitting the sampled three-dimensional histogram data, and the damage and ERL estimates stored in the transmitter memory at fixed intervals and upon request.

11. The duty cycle recording method of claim 9, wherein receiving sensor readings further comprises receiving transmission operating gear sensor readings;

wherein the method further comprises:

storing a plurality of three-dimensional histogram data in control memory of transmission torques and speeds to which the vehicle has been exposed, each of the plurality of three-dimensional histogram data of transmission torques and speeds being for a different transmission operating gear;

sampling the transmission operating gear sensor readings, the transmission torque sensor readings and the transmission speed sensor readings as a pair;

selecting the three-dimensional histogram data of the plurality of three-dimensional histogram data of transmission torques and speeds for the sampled transmission operating gear;

finding a corresponding cell in the selected three-dimensional histogram data for the sampled transmission torque and speed sensor readings; and incrementing a cell counter of the corresponding cell in the selected three-dimensional histogram data.

12. The duty cycle recording method of claim 11, wherein the damage estimates for the drivetrain components are computed based on the accumulated plurality of three-dimensional histogram data of transmission torques and speeds.

13. The duty cycle recording method of claim 12, further comprising:

storing the computed damage and ERL estimates for the drivetrain components in control memory;

sampling the accumulated plurality of three-dimensional histogram data, and the damage and ERL estimates in the control memory;

storing the sampled plurality of three-dimensional histogram data, and the damage and ERL estimates in a transmitter memory; and wirelessly transmitting the sampled plurality of three-dimensional histogram data, and the damage and ERL estimates stored in the transmitter memory at fixed intervals and upon request.

* * * * *